March 12, 1963    J. D. MORGAN    3,080,790
COLOR BALANCE AND EXPOSURE INDICATOR
Filed March 17, 1958
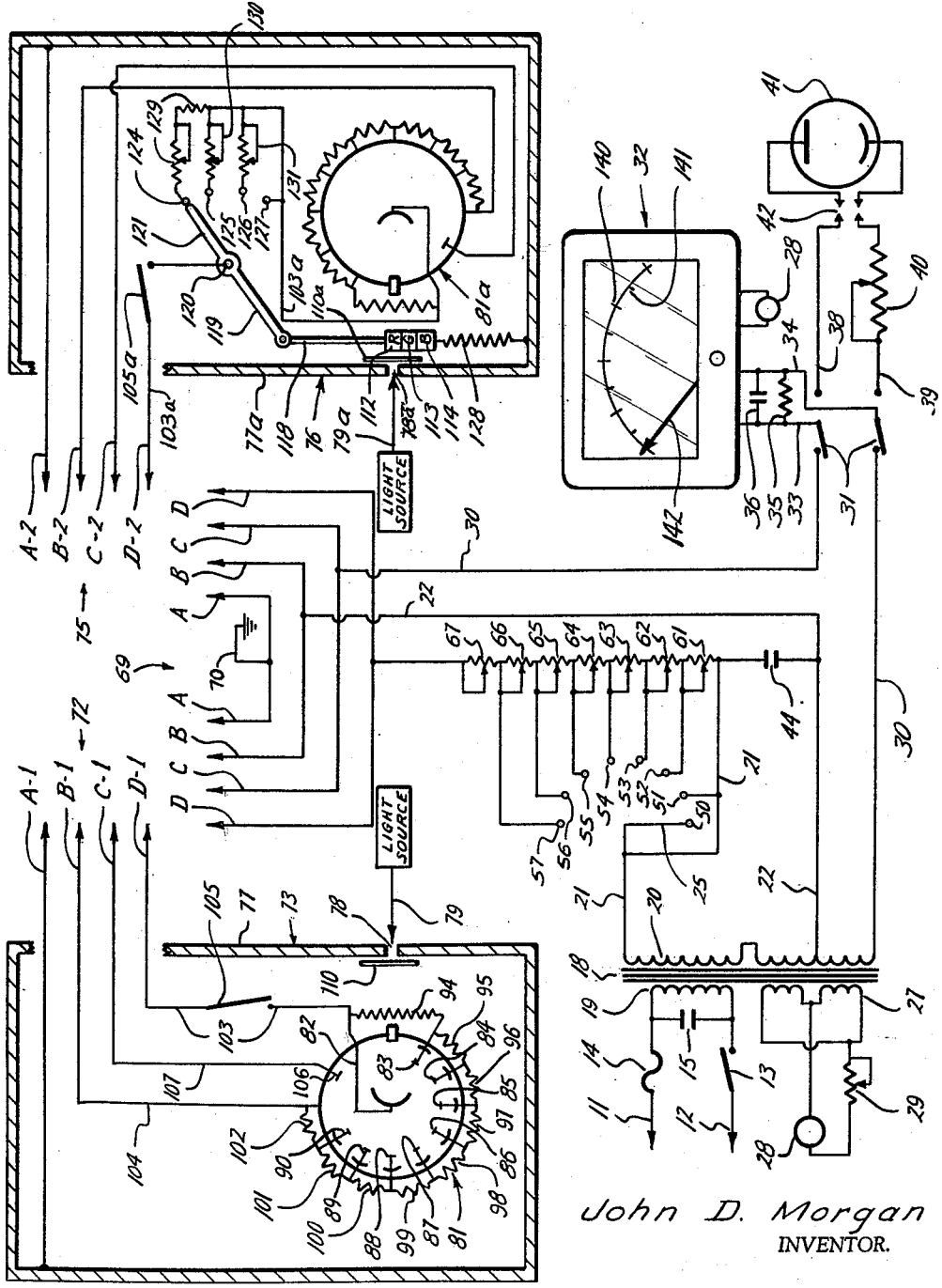
John D. Morgan
INVENTOR.
BY *Carl B. Fox, Jr.*
ATTORNEY

United States Patent Office 3,080,790
Patented Mar. 12, 1963

3,080,790
COLOR BALANCE AND EXPOSURE INDICATOR
John D. Morgan, 1213 Sequoia Blvd., Pasadena, Tex.
Filed Mar. 17, 1958, Ser. No. 721,953
7 Claims. (Cl. 88—23)

This invention pertains to light computors, and, more particularly, to apparatus for determining the intensity of weak light sources and/or the intensities of the color components of such sources. The preferred embodiment herein shown and described illustrates the invention applied to measurement of light emitted from photographic enlargers. The apparatus is arranged so that the light intensity information is delivered in a form for direct use without subsequent computation, this feature of the invention being especially useful in making balanced-color photographic prints.

A principal object of the invention is to provide apparatus for determining light intensities of weak light sources.

Another object of the invention is to provide such apparatus which is stable in use and not susceptible to reading variations usually encountered in such apparatus.

Another object of the invention is to provide such apparatus which is capable of determining the intensities of color components of the light source as well as the composite intensity of the light source.

Another object of the invention is to provide such apparatus which is useful for alteration and/or correction of the color balance of the light source, particularly in connection with the making of color-balanced direct color photographic prints.

A further object is to provide such apparatus which is low in cost and is easily and handily operated.

The invention provides a device of high light measuring sensitivity. The high sensitivity is obtained in a relatively simple manner by alteration of the characteristics of photo multiplier tubes used as receivers of the light to be measured. The circuit of the invention is relatively simple, and stability of the circuit and the light intensity readings is achieved by providing means for shutting off a part of the circuit when it is not in use, this not affecting the warm-up cycle of the apparatus. The preferred embodiment herein shown and described is compact and simple, yet is complete so as to fulfill all light reading requirements for the making of exact color-balanced photographic prints.

Other objects and advantages of the invention will appear from the following description of a preferred embodiment, reference being made to the accompanying drawing which is a schematic circuit diagram showing the layout and operation of the preferred embodiment.

Referring to the drawing, leads 11, 12 are connected to a regulated source (not shown) of alternating current at 110 volts. The source may be regulated in any suitable manner by regulator means, also not shown, to prevent variations greater than plus or minus 2 volts at leads 11, 12. Lead 12 is provided with a switch 13 used in turning the apparatus on and off. Lead 11 has a fuse 14 in series therewith for protection of the apparatus in the customary manner.

A condenser 15 connected across leads 11, 12 further stabilizes the power source. A transformer 18 steps up the voltage introduced at leads 11, 12 to 700 volts (A.C.). Transformer 18 includes primary coil 19 and split secondary coil 20. Leads 21, 22 extend from transformer 18 to a multiple switch 25.

A split winding 27 of transformer 18 is connected to a meter lamp 28. A variable rheostat 29 is in series with the lamp to control its intensity. The lamp serves to indicate that the apparatus is "on," as well as to illuminate the meter dial of the apparatus.

A third lead 30 is connected to the secondary winding of transformer 18. Lead 30 may be connected at dipole switch 31 in series with meter 32, the meter dial being illuminated by lamp 28 as indicated. Leads 33, 34 extend from switch 31 to the meter, and a fixed resistance 35 and a condenser 36 are in parallel with the meter across these leads to stabilize the operation of the meter.

The switch 31 has another position wherein it connects the leads 38, 39 of a standardizing circuit to meter 32. Lead 39 includes a variable resistance 40 (rheostat), and is connected to the positive side of an ordinary photocell 41. Lead 38 is connected to the negative side of cell 41. A plug 42 provides for disconnection of the cell 41 when required. When switch 31 is closed in this position, lead 33 of the meter circuit is connected to lead 38 of the photocell circuit, and lead 34 of the meter circuit is connected to lead 39 of the photocell circuit.

As previously mentioned, switch 31 in its other closed position connects meter 32 in series with lead 30.

Leads 21, 22 are connected through a condenser 44. Switch 25 has a plurality of positions, designated 50–57, position 50 being the "off" position. In positions 51–57, lead 21 is connected across one or more of the variable resistances 61—67, these being connected serially between lead 21 and the plug 69. Condenser 44 is also in series with these resistances between lead 22 and a plug 69.

Plug 69 is grounded as indicated at 70, the ground being to the case (not shown) containing these circuits, or any other suitable ground. As indicated in the drawing, the elements A, B, C, D of plug 69 may be respectively connected either to elements A1, B1, C1, D1 of a plug 72 of a probe assembly 73, or to elements A2, B2, C2, D2 of a plug 75 of a second probe assembly 76.

Probe assembly 73 provides means for receiving light from a source, for example from a photographic enlarger lamp (not shown), and for converting the light to electric energy which can be determined by meter 32. A part of the housing for probe 73 is indicated by reference numeral 77. Housing 77 has a circular aperture 78 therethrough through which light, indicated by reference numeral 79 and by an arrow indicating the light direction, is admitted into the probe housing. A photo multiplier tube 81 is mounted within housing 77 in normal alignment with aperture 78 so that light 79 is received thereby. Photomultiplier 81 is of usual sealed construction and includes a plurality of conventionally arranged dynode elements 82–90, between adjacent of which are connected a plurality of resistance elements 94–102. Element 82 is commonly called the cathode element of the tube, and element 90 is commonly called the final dynode element of the tube. Photo multiplier tube 81 is preferably a so-called "931-A" photo multiplier tube, having resistances connected as indicated and described. However, the 931-A tube here shown is modified. The resistances 94–102, instead of each being 7500 ohms which is usual, are modified so that each resistance 94–102 is 180K ohms. This modification in size of the resistances greatly increases the sensitivity of the tube 81 so that exceedingly weak light sources may be measured by the apparatus.

The terminal ends of the terminal resistances 94 and 102 are respectively connected to elements D1 and B1 of plug 72 by leads 103 and 104. Lead 103 includes a normally-open spring-biased switch 105, the switch 105 being necessary to make the apparatus operative, as will be further explained.

A collector element 106, or anode, is provided and is connected by lead 107 to element C1 of plug 72. Element A1 of plug 72 is connected by lead 108 to the housing 77 to provide a ground.

The apparatus, with plug 72 plugged into plug 69 to connect probe 73, is most frequently used to measure white light, as from a photographic enlarger in making so-called "black and white" photographic prints. A light diffusion element or sheet 110 diffuses light 79 from the enlarger as light 79 enters housing 77 to impinge on tube 81. The diffused light impinging on the first of the series of dynodes, dynode 82 which is aligned with aperture 77, causes an electrical current to flow through the tube, this current being between dynode 82 and collector 106, and between leads 103, 107 connected to the remainder of the apparatus. The dynodes 82–91 each have light-receiving surfaces which have the property of liberating several electrons (electrical current) for each electron which strikes them. Therefore, the series of dynodes, arranged conventionally as described, the initial photo-current between leads 103, 107 is amplified as it passes from dynode to dynode of tube 81. The resulting current through the tube, between leads 103, 107, is greatly multiplied over the current caused by initial dynode 82 and collector 106, particularly in view of the modification of resistances 94–102 to higher than usual value, so that although the intensity of light 79 is very weak, ample current is supplied to actuate meter 32 and give a true reading of the light intensity at the meter.

The switch 105 is closed only momentarily while a light intensity measurement is made.

The apparatus, with plug 75 plugged into plug 69 to connect probe 76, most frequently used to measure light sources where the color components of the light sources are to be separately measured, as in the making of color-balanced photographic prints in color. Probe 76 may also be used, as probe 73, in measuring essentially white light.

Probe 76, sometimes referred to as the "color probe," is similar in its circuit parts to probe 73. Therefore, the elements of probe 76 which correspond to probe 73 elements, need not be again described, and are designated by the same reference numerals as were used in referring to probe 73, with the added designation "a." For example, tube 81a of probe 76 corresponds to tube 81 of probe 73, and is identical therewith.

Housing 77a has aperture 78a through which light 79a is admitted for measurement, the aperture being covered by a diffusion sheet 110a as in the case of probe 73. A plurality of light filtering means, comprising filters 112, 113, 114 are movably mounted between tube 81a and aperture 78a, the sheet 110a being between the filters and aperture. Filter 112 is a red filter for separation of the red light component of light 79a, the red light component producing the cyan component of the final photograph. Filter 113 is a green filter for separation of the green light component of light 79a, the green light component producing the magenta component of the final photograph. Filter 114 is a blue filter for separation of the blue light component from light 79a, the blue light component producing the yellow component of the final photograph.

The filters are disposed connected together side-by-side in the order given. An arm 118 is carried at one end of the connected filters, namely, to the end of the red filter, the arm being in the direction of the row of filters as indicated in the drawings. A pivot arm 119 is pivotally connected laterally of the free end of arm 118. Pivot arm 119 is pivotally mounted intermediate its ends at a pin 120 which is fixed in any suitable manner to housing 77a so that the pivot arm may be rotated about the pin (the manner of affixing the pin to housing 77a is not shown in the drawings). The opposite or other end 121 of pivot arm 119 serves as a switch element for causing electrical connection alternatively between pin 120 and four poles 124–127.

When switch arm 119 is moved to contact its end 121 with poles 124–126, filters 112–114, respectively are brought into the light path between aperture 78a and tube 81a. When end 121 is contacted with pole 127, no filter is in the light path. Spring 128, connected in tension between housing 77a and the bank of filters, serves to move the filters back in the opposite direction from which they are moved by movement of arm 119.

Pin 120 is connected to lead 103a at its issuance from plug 75. The other portion of lead 103a, running from dynode 82a of tube 81a, is connected to four parallel lead elements connected to poles 124–127. The lead elements extending between poles 124–126 and lead 103a each contains a variable resistance, these being designated by reference numerals 129–131, respectively. The lead element extending between pole 127 and lead 103a is a simple wire connection.

The switch 105a is in the part of lead 103a between plug 75 and pin 120.

In using either probe 73 or 76, the probe is placed in position to receive the light to be measured or analysed. The aperture 78 or 78a is placed in alignment with the light source so that the light will pass through the aperture, through the diffusion sheet 110 or 110a, to impinge upon the light receptive part of the multiplier tube 81 or 81a. The switch 105 or 105a is closed, after the tube has been given time to come to equilibrium, and the light reading is taken at meter 32. Switch 105 or 105a is released, or opened, after the reading has been taken.

It is necessary to operate selector switch 25 to a position corresponding to the intensity of the light being measured so that the meter 32 will show a reading within the limits of its scale. The upper scale 140 of meter 32 denotes exposure time in seconds. The lower scale 141 of meter 32 is a linear light value scale. The pointer 142 indicates the readings in the conventional manner. Scale 141 can be calibrated in usual units of light intensity, such as foot candles, if desired.

Before the reading for making a photographic print is made, the apparatus is first standardized or set by means of readings taken using a known standard negative in the enlarger. Therefore, the apparatus is used as a comparative device for comparing any negative with known negatives.

For example, for making black and white photographic prints using photographic paper of the type designated "Medalist J4," using probe 73, a properly exposed print may be made by obtaining a reading of 0.15 foot candle printing light intensity read on meter 32 through a highlight area of the negative from which the print is to be made, the exposure time being 10 seconds. The light intensity necessary for making prints with other types of photographic paper will, of course, vary with the "speed" of the paper. For color balancing (using probe 76), the upper limit of usefulness of the apparatus for red light measurement is about 0.19 foot candle, filter 112 being a "Wrattan #29" red filter; for green, about 0.075 foot candle with filter 113 being a "Wrattan #61" green filter; and for blue, 0.05 foot candle with filter 114 being a "Wrattan #47" blue filter.

The complete range of the apparatus is from about 0.005 foot candle to about one foot candle, each of these values being for full scale deflection of meter 32. The extreme sensitivity of the apparatus, as described by the range given above, makes it possible to determine light of only a fraction of 0.005 foot candle, depending on the calibration of the meter scale. Weak light, such as moonlight, may be readily measured. The tubes 81, 81a shown in the drawing, as has been hereinbefore indicated, are 931–A photo multiplier tubes. The physical characteristics of 931–A tubes are shown in the literature, for example, in "RCA Electron Tube Handbook, Series HB-3," published September 1, 1952, by Radio Corporation of America, Camden, New Jersey, V. 3 and 4. The cathode of 931–A tubes is $5/16''$ x $15/16''$ (minimums), and therefore has a minimum light receiving area of about 0.29 square inch. The aperture area may be of any size, as in hereinafter made clear. 931–A tubes are designed for light reception over the entire cathode area, although sometimes only a part of the cathode area may be utilized, this being well known to those skilled in the art and being common practice.

In using the device for color balancing, the scale reading is set to zero (center of scale) for the reading taken using the standard negative in the enlarger, as is also the case for white light measurement. The scale reading, scale 141, gives a plus (+) or minus (−), variation for the unknown negative, depending on whether more or less light is required for the correct print. The correction may be made by altering either the light intensity or the exposure time.

It will be apparent that the scale readings as described will require no computation before the print exposure is made, as the corrections are read in the form in which they are used.

Since when switch arm 119 is moved so that its end 121 is in contact with pole 127 all of the filters are moved out of the light path to tube 81a, probe 76 can be used as probe 73, and thus probe 73 can be omitted. Probe 76 can be omitted in case no color work is to be done with the apparatus.

In order to further increase the sensitivity of the apparatus, elements 110, 110a, the light diffusion means, may each be optical means such as a lens. The use of a lens permits the apertures 78 or 78a to be of larger size. The lenses concentrates the light of weak intensity before it passes to the light-responsive tube 81 or 81a. With the aperture of any size, use of a lens allows more light to reach the tube.

The switches 105, 105a, which are biased normally open, are closed momentarily while readings are being made. The use of these switches 105, 105a, is one of the most important novel features of the apparatus. Tubes 81, 81a, as in the case of unmodified photo multiplier tubes, require a few minutes to "warm up" before light readings may be made. The unmodified tubes, as conventionally used, are not customarily wired into a circuit having a switch analogous to switch 105 or 105a, and as a result are always found to "drift" to a considerable degree. Such drifting is the main reason why no previous similar apparatus has been entirely satisfactory in use, since a restandardization of the meter with the standard negative has been necessary before each measurement of an unknown negative, or at least at very frequent intervals.

However, the apparatus as herein disclosed need not be restandardized after it is once in operation, even though the operation may extend over a period of several days. The drifting is caused by constant imposition of power to the tube across leads 103, 104 or 103a, 104a, which keeps the receiver dynode 82 constantly heated, and only slight variations in temperature will cause drifting. Switches 105, 105a provide that the dynodes are energized only momentarily while a reading is being taken, and hence the dynodes are never heated to equilibrium temperature. Drifting cannot occur because the temperature effects at the dynodes never come into play.

While a preferred embodiment of the invention has been shown and described, many modifications thereof may be made by a person skilled in the art without separating from the spirit of the invention, and it is intended to protect by Letters Patent all forms of the invention falling within the scope of the following claims.

I claim:

1. Photomultiplier tube apparatus for measuring the intensity of light of extremely low intensity, comprising a photomultiplier tube having a photosensitive cathode and a plurality of dynodes and an anode, the resistances between the dynodes thereof being substantially equal and each being of the order of about 180K ohms, a first electrical power source connected to said photomultiplier tube across said photosensitive cathode and the final dynode thereof, a second electrical power source for separately energizing said anode, and means for measuring electrical current flow through said second power source from said anode.

2. The combination of claim 1, said first and second power sources being coupled through a non-ground common connection to said final dynode.

3. The combination of claim 1, including means for concentrating light from a very weak light source for impingement thereof on said cathode whereby the sensitivity of said apparatus is increased.

4. The combination of claim 1, including means for diffusing light from a light source whereby impingement thereof on said tube is assumed regardless of variations in the direction of said light source.

5. The combination of claim 1, including color filter means having a plurality of filter means of differing light color passage characteristics disposed between the light source and said photomultiplier tube, and means for moving each said filter means separately to an operative position between said light source and tube whereby the color components of said light source may be separately determined and balanced.

6. Photomultiplier tube apparatus for measuring the intensity of light, comprising a photomultiplier tube having a photosensitive cathode and a plurality of dynodes and an anode, the resistances between the dynodes thereof being substantially equal, a first electrical power source connected to said photomultiplier tube across said photosensitive cathode and the final dynode thereof, a second electrical power source coupled to said first power source at the final dynode of said tube for separately energizing said anode, and means for measuring electrical current flow through said second power source from said anode.

7. Combination of claim 6, including normally-open switch means in said connection of said first power source to said cathode which is closed when light intensity measurements are being made, whereby current flow through the tube is prevented except when said measurements are being made.

References Cited in the file of this patent

UNITED STATES PATENTS

| | | |
|---|---|---|
| 2,571,697 | Evans | Oct. 16, 1951 |
| 2,579,764 | Schwennesen | Dec. 25, 1951 |
| 2,647,436 | Shapiro | Aug. 4, 1953 |
| 2,699,086 | Finch | Jan. 11, 1955 |
| 2,700,108 | Shamos | Jan. 18, 1955 |
| 2,711,486 | Smyth | June 21, 1955 |
| 2,809,295 | Reiffel | Oct. 8, 1957 |
| 2,913,585 | Rodman | Nov. 17, 1959 |
| 2,921,498 | Simmon et al. | Jan. 19, 1960 |
| 2,952,780 | Rogers | Sept. 13, 1960 |

OTHER REFERENCES

"Multiplier Photo-Tubes," DuMont, First edition, April 1955, Allen B. DuMont Laboratories, Inc., Clifton, New Jersey. Pages 26, 27 and 28 relied upon.

UNITED STATES PATENT OFFICE
CERTIFICATE OF CORRECTION

Patent No. 3,080,790                                 March 12, 1963

John D. Morgan

It is hereby certified that error appears in the above numbered patent requiring correction and that the said Letters Patent should read as corrected below.

Column 6, line 21, for "assumed" read -- assured --.

Signed and sealed this 8th day of October 1963.

(SEAL)
Attest:

ERNEST W. SWIDER
Attesting Officer

EDWIN L. REYNOLDS
Acting Commissioner of Patents